(12) United States Patent
Yang

(10) Patent No.: US 7,600,057 B2
(45) Date of Patent: Oct. 6, 2009

(54) METHOD AND SYSTEM FOR CONFIGURABLE DRAIN MECHANISM IN TWO-WAY HANDSHAKE SYSTEM

(75) Inventor: Genkun Jason Yang, Saratoga, CA (US)

(73) Assignee: Broadcom Corporation, Irvine, CA (US)

(*) Notice: Subject to any disclaimer, the term of this patent is extended or adjusted under 35 U.S.C. 154(b) by 433 days.

(21) Appl. No.: 11/063,815

(22) Filed: Feb. 23, 2005

(65) Prior Publication Data

US 2006/0212616 A1    Sep. 21, 2006

(51) Int. Cl.
G06F 3/00 (2006.01)
(52) U.S. Cl. .................... 710/29; 710/38; 370/229
(58) Field of Classification Search .............. 710/29, 710/713–714; 709/220–221, 238, 242; 370/216, 370/231, 235–235.1, 241, 244, 250, 357, 370/360
See application file for complete search history.

(56) References Cited

U.S. PATENT DOCUMENTS

| | | | | |
|---|---|---|---|---|
| 5,555,264 A | * | 9/1996 | Sallberg et al. | 370/414 |
| 5,650,993 A | * | 7/1997 | Lakshman et al. | 370/236 |
| 5,717,871 A | * | 2/1998 | Hsieh et al. | 710/317 |
| 5,732,085 A | * | 3/1998 | Kim et al. | 370/398 |
| 5,790,770 A | * | 8/1998 | McClure et al. | 709/231 |
| 6,118,791 A | * | 9/2000 | Fichou et al. | 370/468 |
| 6,219,728 B1 | * | 4/2001 | Yin | 710/52 |
| 6,230,206 B1 | * | 5/2001 | Doole et al. | 709/235 |
| 6,449,254 B1 | * | 9/2002 | Hadjiahmad | 370/235 |
| 2002/0080789 A1 | * | 6/2002 | Henderson et al. | 370/392 |
| 2003/0067877 A1 | * | 4/2003 | Sivakumar et al. | 370/232 |
| 2003/0115401 A1 | * | 6/2003 | Herr | 710/317 |
| 2003/0135640 A1 | * | 7/2003 | Ho et al. | 709/237 |
| 2003/0179759 A1 | * | 9/2003 | Wang | 370/399 |
| 2005/0213570 A1 | * | 9/2005 | Stacy et al. | 370/389 |

* cited by examiner

*Primary Examiner*—Eron J Sorrell
(74) *Attorney, Agent, or Firm*—McAndrews, Held & Malloy, Ltd.

(57) ABSTRACT

A method and system for configurable drain for two-way handshake system is provided and may comprise coupling a transmitting device to a drain bucket, and draining unwanted data at the transmitting device. The drain bucket may be configurably coupled to the transmitting device via a switch, where the switch may be a crossbar switch. The drain bucket may receive at least one transmitter handshake signal from at least one transmitting device. The drain bucket may transmit at least one receiver handshake signal to the at least one transmitting device. The receiver handshake signal may be asserted at least as long as the received transmitter handshake signal is asserted. The receiver handshake signal may be based on the received transmitter handshake signal. For example, the received transmitter handshake signal may be looped back by the receiver as the receiver handshake signal. The method may also comprise generating the receiver handshake signal utilizing at least one of combinational logic and sequential logic.

20 Claims, 6 Drawing Sheets

METHOD AND SYSTEM FOR CONFIGURABLE DRAIN MECHANISM IN TWO-WAY HANDSHAKE SYSTEM

CROSS-REFERENCE TO RELATED APPLICATIONS/INCORPORATION BY REFERENCE

Not Applicable.

FIELD OF THE INVENTION

The present invention relates to communication between data transmitting and data receiving circuits and, more particularly, to a method and system for configurable drain mechanism in two-way handshake system.

BACKGROUND OF THE INVENTION

There are two general methods of sending messages when communicating. One method may comprise sending messages and data without regard to whether they are received, which is referred to as unreliable delivery. The other method may comprise sending messages and data with some methodology ensuring that the sent messages are received, which is referred to as reliable delivery. An example of unreliable delivery is the typical mail sent via US Post Office's first class, second class, or third class services. In this regard, mail may be sent but there is no way to know if the mail has been received. Another common example may be radio or television broadcasts where the broadcasting station sends out signals but has no intelligence to determine whether anybody is receiving the signals. A networking example may involve the user datagram protocol (UDP), a connectionless transport protocol, which is sometimes used in Internet data transfers by applications for email or file transfer. The UDP makes no attempts to verify that a sent packet was actually received by an intended recipient. The UDP's task is finished when it places a packet on a network with a destination address. The application program that used the UDP may ensure reliable delivery with a higher-level protocol.

In contrast, there is another protocol, which is utilized for most Internet transmissions, namely, transmission control protocol (TCP). TCP provides reliable transmission of data by providing connection-oriented, end-to-end reliable packet delivery through a network or through the Internet. It does this by assigning sequence numbers to packets to indicate to the destination the number of packets and the order of the packets that may be received. The destination acknowledges receipt of each packet and packets that are not acknowledged within a specified time period are retransmitted. If the destination does not receive an expected packet within a specified time, it may request that the packet be resent. The reliability mechanism of TCP allows devices to deal with lost, delayed, duplicate, or misread packets.

Electronic systems, such as personal computers (PCs), use both reliable and unreliable messaging systems to transmit data. A typical bus on the PC is an unreliable delivery system—a sender places data on the bus and assumes that the destination will receive the data. An example of a reliable delivery system used by the PC is the IEEE 1284 parallel port standard, often used for communication between a PC and a printer. The PC places a byte of data on the parallel port and asserts a strobe signal. The printer may receive the data and answer the strobe signal by asserting an acknowledge signal. The host may then deassert the strobe signal, place another byte on the parallel port, and reassert the strobe signal. This type of signal exchange for data delivery may be called handshaking.

When multiple transmitters and receivers that use handshaking signals are coupled via a switchable circuitry, a receiver may switch to receive from a different transmitter from time to time. This may happen, for example, when different data from a different channel may be desired. In that event, the transmitter from which the receiver just switched may have backed up data that still needs to be sent. If another receiver connects to this transmitter, the new receiver may get garbage data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for configurable drain mechanism in two-way handshake system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
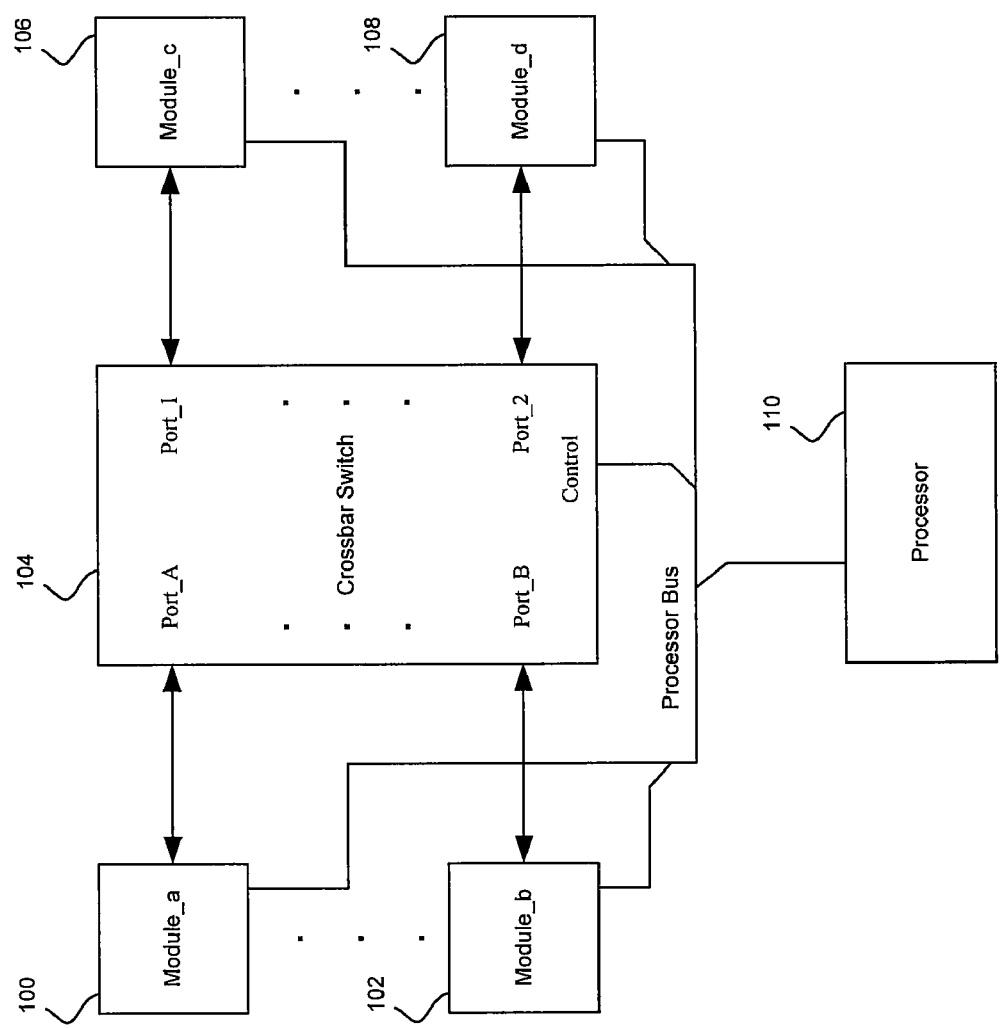
FIG. 1a is an exemplary block diagram illustrating plurality of modules connected by a crossbar switch, in connection with an embodiment of the invention.

Certain embodiments of the invention may be found in a method and system for configurable drain mechanism in two-way handshake system. An implementation of the two-way handshake communication system may be utilized where a transmitting device transmits data and asserts a data ready signal RDY. Upon receiving the asserted data ready signal RDY, the receiving device may store the data, for example, in a data register or memory, and may assert the data accept signal ACPT. If the transmitting device has no more data to send, then it may deassert the data ready signal RDY. The receiving device may acknowledge the deasserted data ready signal RDY by deasserting the data accept signal ACPT. The cycle of assertion and deassertion may be repeated at a later time when the transmitting device has more data to send.

Alternatively, the transmitting device may keep the data ready signal RDY asserted and send additional data synchronously to a clocking signal. The receiving device may receive all transmitted data using the same clocking signal, or another clocking signal that may be synchronized to the transmitting clocking signal. When the transmitting of data is complete, the transmitting device may deassert the data ready signal RDY. The receiving device may acknowledge the deasserted data ready signal RDY by deasserting the data accept signal ACPT.

However, sometimes, the transmitting devices may need to have data remaining in their queue waiting to be transmitted flushed. This may happen, for example, when a receiving device Y switches from a first transmitting device A to a second transmitting device B. The data accept signal ACPT may be deasserted. The transmitting device A may then stall because it may be waiting for an asserted data accept signal ACPT before it may transmit more data. When a receiving device Z switches to receive from the transmitting device A, it may see the data ready signal RDY asserted, and may assert its data accept signal ACPT. The transmitting device A may then continue to send data. However, this data may not be intended for the receiving device Z since it was originally intended to be received by the receiving device Y. If the receiving device Z receives this data, it may generate an erroneous output based on this unintended data. Alternatively, the receiving device Z may spend precious processing resources and time discarding the erroneous data that was received from the transmitting device A.

An embodiment of the invention may drain, or remove, the unwanted data that the stalled transmitting device A may have in its output queue. An embodiment of the invention may also be utilized during power-up and/or during debugging to test the hardware and/or code, for example, software or firmware. In this regard, the hardware test may be utilized to determine whether a transmitting device is properly configured and/or is correctly operating during transmission. A hardware test may also be utilized to determine whether communication paths between the transmitting devices and the receiving devices are valid. Some examples of the code tested may be code that configures or sets up a transmitting device with data, and code that may be utilized to configure a switch that may connect one or more transmitting devices to one or more receiving devices.

FIG. 1a is an exemplary block diagram illustrating transmitting and receiving modules connected by a crossbar switch, in connection with an embodiment of the invention. Referring to FIG. 1a, there is shown a plurality of input modules, module_a 100, . . . , module_b 102, and a plurality of output modules, module_c 106, . . . , module_d 108, a crossbar switch 104, and a processor 110. In a video processing system, for example, each of the plurality of input modules, module_a 100, . . . , module_b 102, and plurality of output modules, module_c 106, . . . , module_d 108, may comprise suitable logic, circuitry and/or code that may be adapted to process signals, for example, video signals. Video signals may comprise luma and chroma pixels, where the luma pixels may contain brightness information and the chroma pixels may contain color information.

The crossbar switch 104 may comprise a plurality of input ports, Port_A, . . . , Port_B, a plurality of output ports, Port_1, . . . , Port_2, and a control input. The crossbar switch 104 may comprise suitable logic, circuitry and/or code that may be adapted to facilitate transfer signals from any input port to any output port by connecting a selected input port to a selected output port. The crossbar switch 104 may also be adapted to transfer signals from any input port to multiple output ports. However, an output port may only be connected to one input port at any given instant. An input or output port may communicate multiple unidirectional and/or bidirectional signals. The crossbar switch may be configured to connect various input ports to various output ports via control signals communicated via the control input.

The processor 110 may comprise suitable logic, circuitry and/or code that may be adapted to process code and/or control functionalities of other blocks in a system. For example, the processor 110 may process the input modules, module_a 100, . . . , module_b 102, and the output modules, module_c 106, . . . , module_d 108, and/or the crossbar switch 104.

In operation, the input modules, module_a 100, . . . , module_b 102, and the output modules, module_c 106, . . . , module_d 108 may be coupled to the crossbar switch 104. The module_a 100 may be, for example, an encoder that may convert analog video signals to digital video signals utilizing a chroma subsampling format, and the module_b 102 may be a format converter that converts the chroma subsampling format of an input digital video signals to another chroma subsampling format. An example of chroma subsampling format may be a 4:2:2 chroma subsampling format, which may sample the horizontal chroma pixels at one-half the rate of the horizontal luma pixel sampling rate, but the vertical sampling rate may be the same for both chroma and luma pixels. The output modules 106, . . . , 108 may, for example, process the digital video signals from the input modules 100, . . . , 102.

The processor 110 may control the operation of the plurality of input modules 100, . . . , 102, and output modules 106, . . . , 108 and the crossbar switch 104 by indicating via a processor bus certain actions that may be performed. For example, the processor 110 may configure the crossbar switch 104 to break all connections during power-up so that no input port may be coupled to any output port. For example, the processor 110 may configure the crossbar switch 104 to couple the input port, Port_A, to the output port, Port_2, and the input port, Port_B, to the output port, Port_1. In this manner, the module_a 100 may be coupled to the module_d 108, and the module_b 102 may be coupled to the module_c 106. Accordingly, the module_a 100 may communicate signals to the module_d 108, and vice versa, and the module_b 102 may communicate signals to the module_c 106, and vice versa.

Figure 1B:
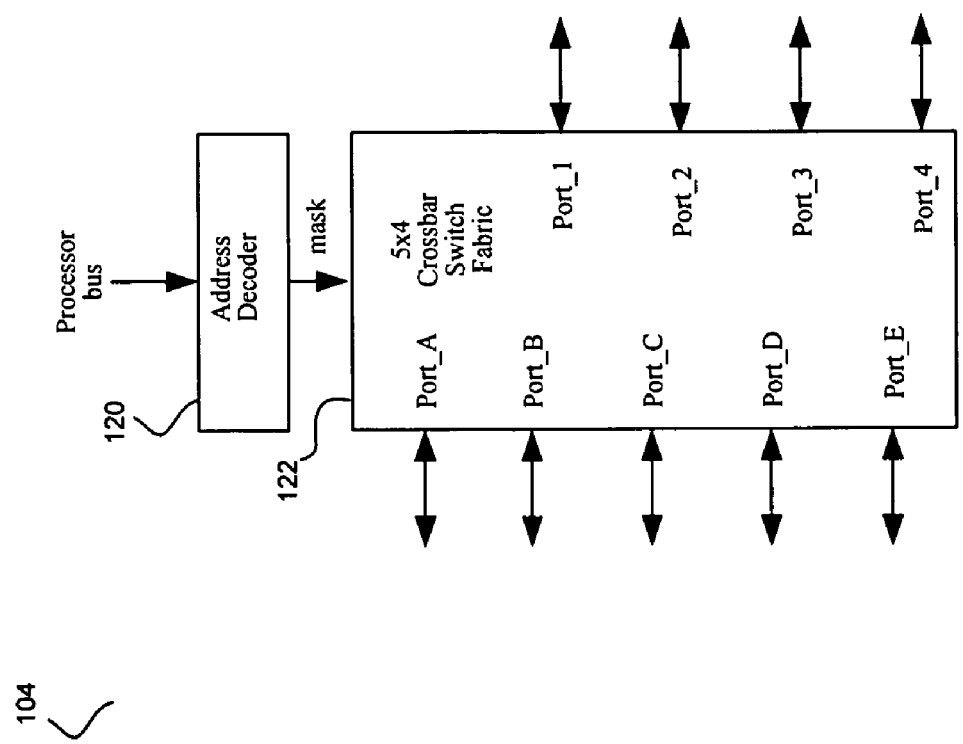
FIG. 1b is an exemplary block diagram illustrating a 5×4 crossbar switch, which may be utilized in connection with an embodiment of the invention.

FIG. 1b is an exemplary block diagram illustrating a 5×4 crossbar switch, which may be utilized in connection with an embodiment of the invention. Referring to FIG. 1b, there is shown an address decoder 120 and a crossbar switch fabric 122. The address decoder 120 may comprise suitable logic, code and/or circuitry that may be adapted to receive information from a processor, for example, the processor 110 (FIG. 1a). The information received may indicate which input port may be connected to which output port, and the address decoder 120 may indicate to the crossbar switch fabric 122 the correct input port to connect to the correct output port. The input ports may be Port_A, Port_B, Port_C, Port_D, and Port_E, and the output ports may be Port_1, Port_2, Port_3 and Port_4. The crossbar switch fabric 122 may comprise suitable logic and/or circuitry that may be adapted to connect an input port, for example, Port_A, to an output port, for example, Port_3.

In operation, the address decoder 120 may receive information from the processor 110 to connect a selected input port to a selected output port. The address decoder 120 may then indicate to the crossbar switch fabric 122 the information needed so that the 5×4 crossbar switch fabric 122 may connect the correct input port to the correct output port. For example, the processor 110 may indicate that an input port, Port_A, may be connected to an output port, Port_3. In this configuration, a module coupled to Port_A, for example, the module_a 100 (FIG. 1a), may communicate with a module coupled to Port_3, for example, the module_c 106 (FIG. 1a). Although the ports may be referred to as input or output ports, any port may communicate signals bidirectionally. Therefore, in the example above, the module_a 100 may communicate information to the module_c 106, and vice versa. The module_a 100 and the module_c 106 may utilize handshaking signals to transfer data. A handshaking signal may be communicated from the module_a 100 to the module_c 106. In return, the module_c 106 may communicate a response handshake signal to module_a 100.

Figure 1C:
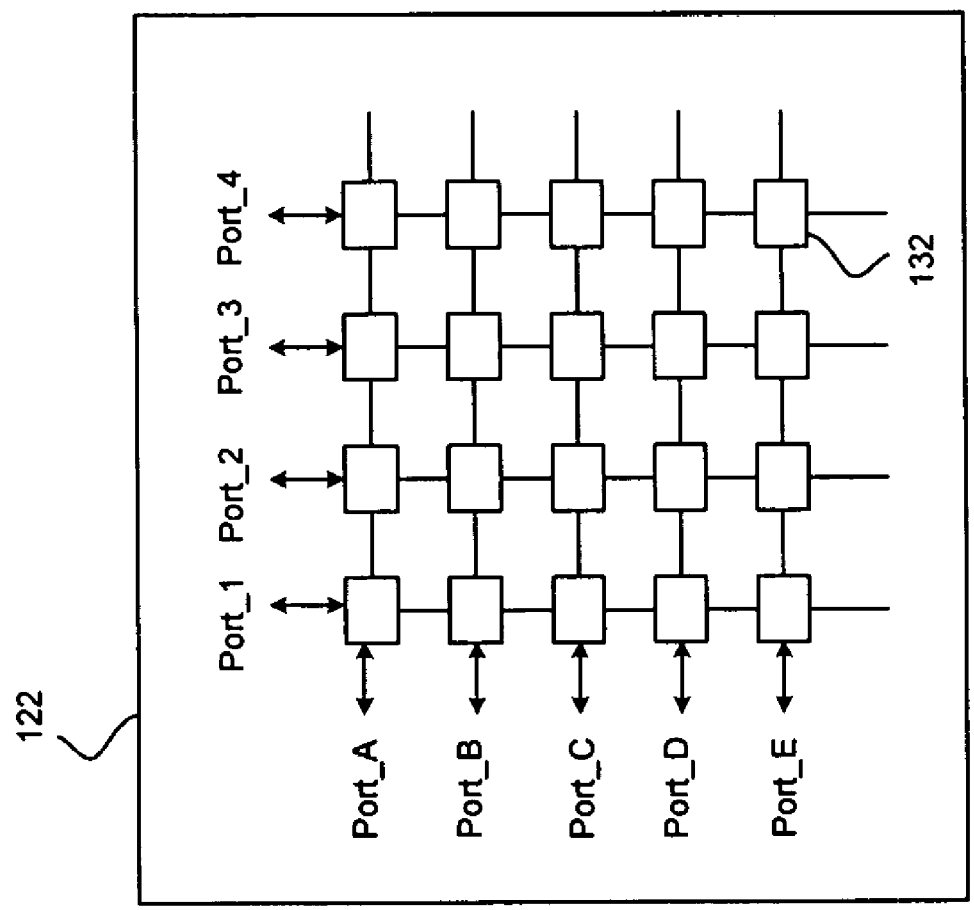
FIG. 1c is an exemplary block diagram illustrating a 5×4 crossbar switch fabric of FIG. 1b, which may be utilized in connection with an embodiment of the invention.

FIG. 1c is an exemplary block diagram illustrating internal mechanism of the 5×4 crossbar switch fabric of FIG. 1b, which may be utilized in connection with an embodiment of the invention. Referring to FIG. 1c, there is shown the crossbar switch fabric 122. The crossbar switch fabric 122 may comprise five input ports, Port_A, Port_B, Port_C, Port_D, and Port_E, and four output ports, Port_1, Port_2, Port_3, and Port_4. The crossbar switch fabric 122 may also comprise a plurality of switch elements 132. Each switch element 132 may comprise logic, circuitry and/or code that may be adapted to make or break a connection that may allow communication between an input port and an output port. Whether the connection is made or broken may be determined by an external processor, for example, the processor 110 (FIG. 1a).

For example, in operation, the processor 110 may indicate to the crossbar switch 104 to connect the input port, Port_E, to the output port, Port_3. The processor 110 may send information indicating this via the processor bus (FIG. 1b) to the address decoder 120. The address decoder 120 may send a mask whose value may configure the switch fabric 122 to couple the input port, Port_E, to the output port, Port_3. The result may be that the switch element 132, which may be the switch element that may allow connection between the input port, Port_E, and the output port, Port_3, may be configured to allow transfer of data from the input port, Port_E, and to the output port, Port_3, and vice versa.

Figure 2B:
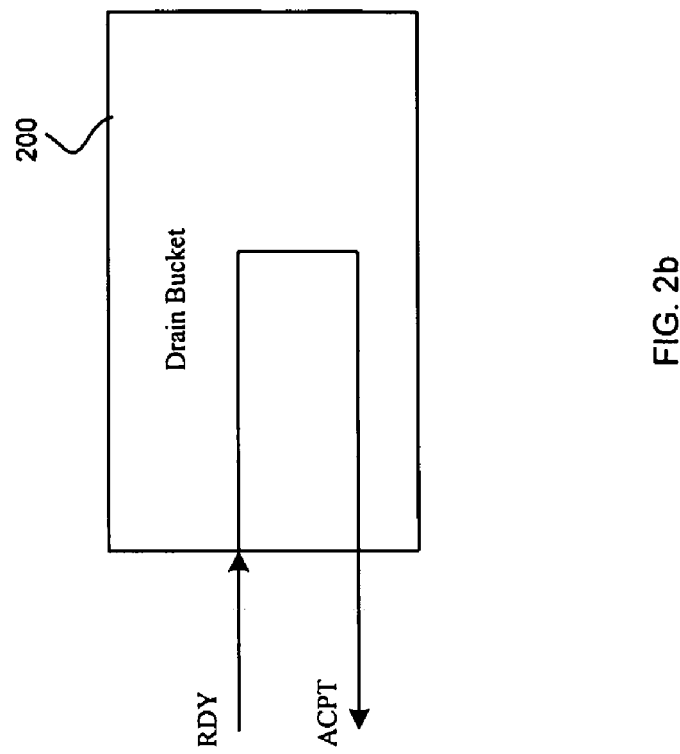
FIG. 2b is an exemplary block diagram illustrating a drain bucket, for example, of FIG. 2a, in accordance with an embodiment of the invention.
Figure 2A:
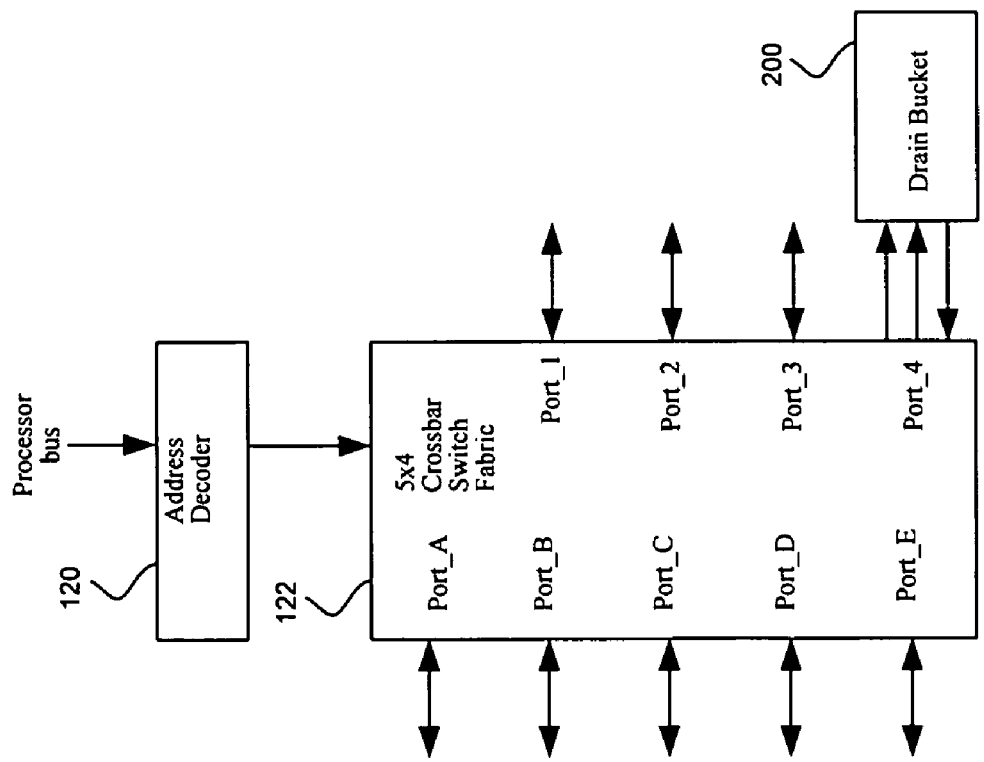
FIG. 2a is an exemplary block diagram illustrating a 5×4 crossbar switch with drain bucket coupled to a crossbar switch output, which may be utilized in connection with an embodiment of the invention.

FIG. 2a is an exemplary block diagram illustrating a 5×4 crossbar switch with drain bucket coupled to a crossbar switch output, in accordance with an embodiment of the invention. Referring to FIG. 2a, there is shown the address decoder 120, the crossbar switch fabric 122 and a drain bucket 200. The address decoder 120 and the crossbar switch fabric 122 may be similarly as described in FIG. 1b. The drain bucket 200 may comprise suitable logic, circuitry, and/or code that may be adapted to receive handshake signals, for example, the data ready signal, RDY, and output a response handshake signal, for example, the data accept signal, ACPT.

In operation, the modules, for example, the module_b 102 (FIG. 1a) and module_d 108 (FIG. 1a) may be coupled to the crossbar switch fabric 122 and may utilize the handshake signals RDY and ACPT. The module_b 102 may be transmitting video data to the module_d 108 for video filtering, and, therefore, both the data ready signal, RDY, from the module_b 102 and the data accept signal, ACPT, from the module_d 108 may be asserted. The processor 110 may communicate to the address decoder 120 to disconnect the module_b 102, which may be coupled to the input port, Port_C, from module_d 108, which may be coupled to the output port, Port_1. The address decoder 120 may indicate to the crossbar switch fabric 122 that the input port, Port_C, may be disconnected from the output port, Port_1. However, since the module_b 102 may have additional data that is still in queue to be transmitted, the processor 110 may further communicate to the address decoder 120 to connect the input port, Port_C, to the output port, Port_4. Accordingly, the module_b 102 may be coupled to the drain bucket 200.

Since the data ready signal RDY from the module_b 102 may still be asserted, the drain bucket 200 coupled to the output port, Port_4, may receive the data ready signal RDY and transmit an asserted data accept signal ACPT. In this manner, the module_b 102 may empty its output buffer. The processor 110 may then communicate to the address decoder 120 to disconnect the input port, Port_C, from the output port, Port_4. Therefore, if the module_b 102 is subsequently connected to another module, for example, module_c 106 (FIG. 1a), the data transmitted by the module_b 102 may be valid data for the module_c 106.

Although data is illustrated as being drained from one source at a time, the invention need not be so limited. Accordingly, an embodiment of the invention may comprise multiple drain buckets coupled to multiple output ports of a crossbar switch. Another embodiment of the invention may comprise suitable logic, circuitry, and/or code that may be adapted to intercept the handshake signal and/or data from at least one transmitting device when the drain bucket is draining data from at least one transmitting device. The drain bucket may not allow the handshake signal from the handshake signal from the transmitting device to reach the receiving device, and vice versa. The drain bucket may generate a response handshake signal to allow the transmitting device to continue sending data. In normal operation, when the receiving device is receiving data from the transmitting device, the drain bucket may allow the handshaking signal and/or the data from the transmitting device to reach the receiving device. Similarly, the handshake signal from the receiving device may be allowed to the transmitting device.

FIG. 2b is an exemplary block diagram illustrating a drain bucket, for example, of FIG. 2a, in accordance with an embodiment of the invention. Referring to FIG. 2b, there is shown the drain bucket 200. The drain bucket 200 may function somewhat similarly as described with respect to FIG. 2a.

In operation, the drain bucket 200 may receive the data ready signal RDY asserted by the transmitting device, for example, the module_a 100 (FIG. 1a), and transmit it back to the module_a 100 as the data accept signal ACPT. In this manner, the module_a 100 may transmit data until all of the data may be transmitted. The data from the module_a 100 may be transferred to the output port, for example, the output port, Port_4, where the data may not be saved since no device may be present to save the data.

Figure 2C:
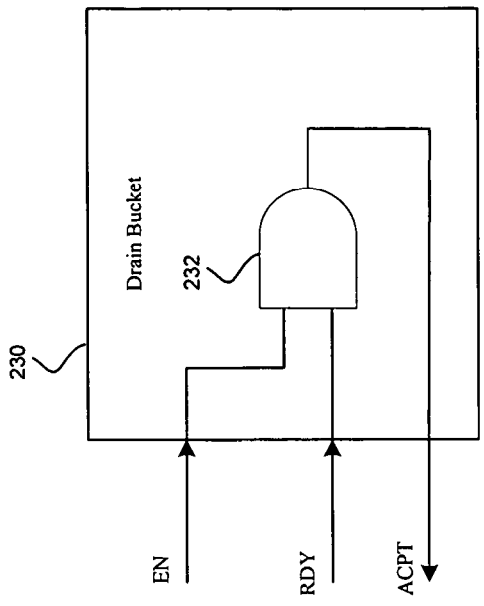
FIG. 2c is an exemplary block diagram illustrating a drain bucket utilizing sequential logic, in accordance with an embodiment of the invention.

FIG. 2c is an exemplary block diagram illustrating a drain bucket utilizing sequential logic, in accordance with an embodiment of the invention. Referring to FIG. 2c, there is shown a drain bucket 220 and a flip-flop 222. The drain bucket 220 may function somewhat similarly as the drain bucket 200 described with respect to FIG. 2a. The flip-flop 222 may comprise suitable logic and/or circuitry that may be utilized to store data.

In operation, the flip-flop 222 may utilize a clock signal CLK to store the data at an input of the flip-flop 222 and transfer the stored data to an output of the flip-flop 222. The clock signal CLK may or may not be similar to a clock signal utilized by a transmitting device, for example, the module_a 100 (FIG. 1*a*). The input of the flip-flop 222 may be the data ready signal RDY, and the output of the flip-flop 222 may be the data accept signal ACPT. When the data ready signal RDY changes states, for example, from an asserted state to an unasserted state, or vice versa, the output of the flip-flop 222 may similarly change states as the input signal of the flip-flop 222 is clocked in by the clock signal CLK. In this manner, the transmitting device may transmit data after it asserts the data ready signal RDY, and receives back an asserted data accept signal ACPT from the drain bucket 220. When the transmitting device may have finished sending data, it may deassert the data ready signal RDY, and the drain bucket 220 may also transmit a deasserted data accept signal ACPT.

Figure 2D:
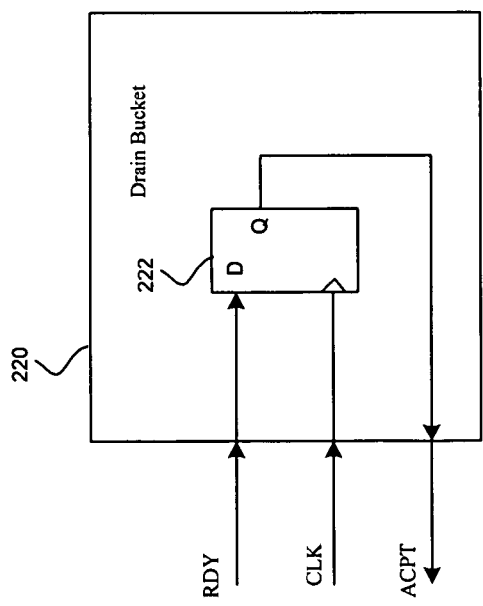
FIG. 2d is an exemplary block diagram illustrating a drain bucket utilizing combinational logic, in accordance with an embodiment of the invention.

FIG. 2*d* is an exemplary block diagram illustrating a drain bucket utilizing combinational logic, in accordance with an embodiment of the invention. Referring to FIG. 2*c*, there is shown a drain bucket 230 and an AND gate 232. The drain bucket 230 may function somewhat similarly as the drain bucket 200 described with respect to FIG. 2*a*. The AND gate 232 may comprise suitable logic and/or circuitry that may be adapted to assert a logic 1 if all inputs are logic 1 and a logic 0 if any input is logic 0.

In operation, the data ready signal RDY may be an input to the AND gate 232 and an enable signal EN may be another input to the AND gate 232. The enable signal EN may be generated by, for example, the address decoder 120 (FIG. 2*a*) from command and/or address communicated by, for example, the processor 110 (FIG. 1*a*) via the processor bus. When the enable signal EN is deasserted, the drain bucket 230 may communicate the deasserted data accept signal ACPT to the transmitting device, for example, the module_a 100 (FIG. 1*a*). When the enable signal EN is asserted, the drain bucket 230 may communicate the data accept signal ACPT, which may be the same state as the data ready signal RDY, to the transmitting device. The transmitting device may transmit data when both the data ready signal RDY and the data accept signal ACPT are asserted.

Figure 2E:
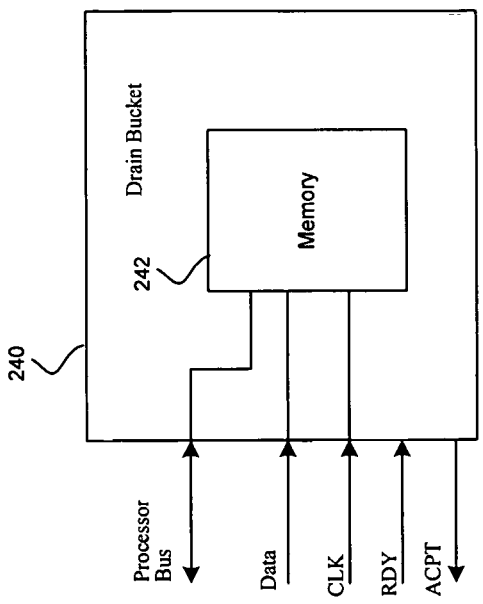
FIG. 2e is an exemplary block diagram illustrating a drain bucket utilizing a memory block, in accordance with an embodiment of the invention.

FIG. 2*e* is an exemplary block diagram illustrating a drain bucket utilizing a memory block, in accordance with an embodiment of the invention. Referring to FIG. 2*c*, there is shown a drain bucket 240 and a memory block 242.

The drain bucket 240 may function somewhat similarly as the drain bucket 200 described with respect to FIG. 2*a* when receiving data ready signal RDY and transmitting data accept signal ACPT. However, the drain bucket 240 may also store data that may be transmitted by the transmitting device, for example, the module_a 100 (FIG. 1*a*), in the memory block 242. The memory block 242 may comprise suitable logic and/or circuitry that may be utilized to store data. For example, the memory block 242 may be a random access memory (RAM) that may be volatile or non-volatile. An example of a volatile memory may be dynamic RAM (DRAM) or static RAM (SRAM) and an example of non-volatile memory may be a flash memory. In addition to being able to store data, the memory block 242 may have an interface to a processor, for example, the processor 110 (FIG. 1*a*), which may read the data that may have been stored-in the memory block 24-2.

The memory addresses used to store the received data may be determined in a plurality of ways. For example, the starting memory address may be pre-determined and the data may be stored to memory locations starting at the pre-determined address. An alternative method may have the starting memory address written to a register by a processor, for example, the processor 110. Additionally, signals may be required for write and/or read operations for the memory block 242. These signals may comprise addresses, chip select and write enable for the SRAMs. The DRAMs may require row address strobe (RAS), column address strobe (CAS), column address, row address, and write enable signals. The signals that may be required for memory operations may be synchronously generated with respect to a clock signal CLK, which may be the same clock signal utilized by the transmitting device to transmit data, or which may be synchronized to a clock signal utilized by the transmitting device to transmit data.

In operation, the drain bucket 240 may receive and transmit handshake signals as described with respect to FIG. 2*a*. Additionally, the drain bucket 240 may store data received from the transmitting device, and the stored data may be accessed by the processor 110 via, for example, the processor bus. In this manner, the processor 110 may be able to verify several things. For example, the processor 110 may be able to verify that the transmitting device transmitted the correct amount of data, and/or the correct data. The processor 110 may compare the data stored in the memory block 242 to the data that was transmitted by the transmitting device. A copy of the data transmitted by the transmitting device may have been saved in system memory for this purpose. Alternatively, the processor 110 may utilize an algorithm, for example, start at the value zero and increment by one for each byte, to verify the stored data. The processor 110 may also be able to verify that a switch, for example, the crossbar switch 104, was configured to correctly connect the desired transmitting device, for example, the module_a 100, to the desired receiving device, for example, the drain bucket 240.

Although the FIGS. 2*a*-2*e* may show various embodiments of the invention, the invention need not be so limited. For example, an embodiment of the invention may comprise sequential logic and/or combinational logic, of various complexity. Another embodiment of the invention may allow the drain bucket to intercept at least one handshaking signal and/or the data signal. In this manner, the drain bucket circuitry may pass on the handshaking signals during normal operation, or generate the data accept signal ACPT to the transmitting device while sending a deasserted data ready signal RDY to the receiving device. This may allow draining of data from the transmitting device while the drain bucket may not need a dedicated switch port, for example, the output port, Port_4 (FIG. 2*a*). The drain bucket may also comprise suitable logic, circuitry and/or code that may be adapted to handle multiple transmitting devices simultaneously. Another embodiment of the invention may utilize memory that may not be local to the drain bucket 240. For example, the memory utilized to store received data may be part of a system memory accessible at least to the drain bucket 240 and to the processor 110.

Figure 3:
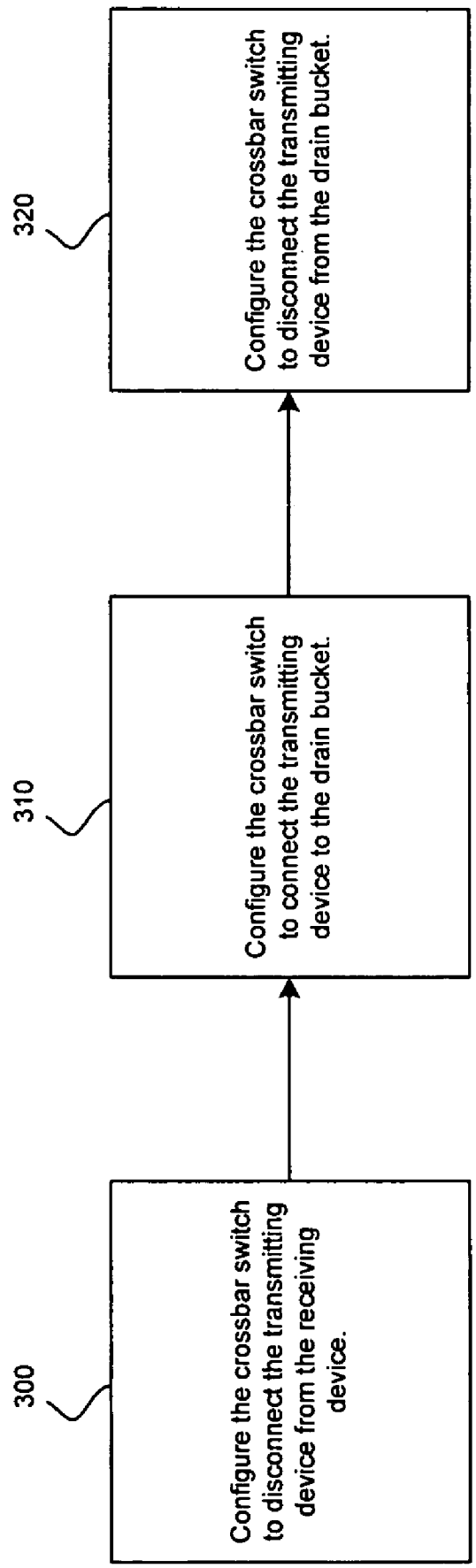
FIG. 3 is an exemplary flow diagram illustrating draining data from a transmitting device utilizing handshaking, in accordance with an embodiment of the invention.

FIG. 3 is an exemplary flow diagram illustrating draining data from a transmitting device utilizing handshaking, in accordance with an embodiment of the invention. Referring to FIG. 3, in step 300, the crossbar switch may be configured to disconnect the transmitting device from the receiving device. In step 310, the crossbar switch may be configured to connect the transmitting device to the drain bucket. In step 320, the crossbar switch may be configured to disconnect the transmitting device from the drain bucket.

Referring to FIGS. 1*a*, 2*a* and 3, the steps 300 to 320 may be utilized to drain data that may be waiting to be transmitted. In step 300, a processor, for example, the processor 110 (FIG. 1*a*), may determine that the receiving device, for example, the module_d 108, need not receive any more data from the transmitting device, the module_a 100. This may be due to a change in application of a terminal equipment, which utilizes an embodiment of the invention, by a user. For example, the terminal equipment may be a handheld wireless system that may have the capability to browse the Internet, download video files, and play the video file. The terminal equipment may have been utilized to browse a web page, but the user may have decided to view a previously downloaded video. Therefore, the wireless web interface, which may be the module_a 100, may need to be disconnected from the module_d 108, which may process data from the wireless web interface module_a 100.

Accordingly, the processor 110 may communicate information to the address decoder of a crossbar switch, such as, for example, the address decoder 120 (FIG. 2a), to configure the crossbar switch to disconnect the module_a 100 from the module_d 108. The address decoder 120 may indicate to the crossbar switch fabric 122 (FIG. 2a) the information needed so that the correct input port may be disconnected from the correct output port.

However, after the disconnection, the wireless web interface module_a 100 may still have web data that may be waiting to be transmitted to the web data processor module_d 108. Therefore, in step 310, the processor 110 may communicate information to the address decoder 120 to configure the crossbar switch fabric 122 to connect the wireless web interface module_a 100 to the drain bucket 200. Upon being connected, the drain bucket 200 may receive the asserted data ready signal RDY from the web interface module_a 100, and transmit the asserted data accept signal ACPT to the web interface module_a 100. In this manner, the web interface module_a 100 may transmit all of the data waiting to be transmitted to a receiving device, such as, for example, the web data processor module_d 108.

In step 320, the processor 110 may determine that the web interface module_a 100 may have transmitted all the data that was waiting to be transmitted. The processor 110 may then communicate information to the address decoder 120 to configure the crossbar switch fabric 122 to disconnect the wireless web interface module_a 100 from the drain bucket 200.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data, the method comprising:
coupling a transmitting device to an input port of a switch;
coupling a receiving device to a first output port of the switch, the receiving device and the transmitting device being in communication via the switch;
coupling a drain bucket to a second output port of the switch;
controlling the transmitting device, the receiving device and the switch with a processor;
breaking communication between the transmitting device and the receiving device such that the transmitting device has untransmitted data destined for the receiving device in an output queue of the transmitting device;
after said breaking communication, coupling the transmitting device to the drain bucket by coupling the input port of the switch to the second output port of the switch; and
transmitting the untransmitted data through the switch to the drain bucket.

2. The method according to claim 1, wherein the transmitting device is not in communication with the drain bucket until after breaking communication between the transmitting device and the receiving device.

3. The method according to claim 1, comprising:
configurably coupling the drain bucket to the transmitting device via the switch,
wherein the processor configures the coupling between the input port of the switch and the second output port of the switch.

4. The method according to claim 3, wherein the switch comprises a crossbar switch that is configured by a decoder.

5. The method according to claim 1, comprising:
receiving, at the drain bucket, at least one transmitter handshake signal from said transmitting device.

6. The method according to claim 5, comprising:
transmitting at least one handshake response signal in response to the received at least one transmitter handshake signal to the transmitting device,
wherein the state of the handshake response signal is the same as the state of the transmitter handshake signal.

7. The method according to claim 6, comprising:
generating the at least one handshake response signal utilizing at least one of combinational logic and sequential logic.

8. The method according to claim 7, comprising:
enabling the generating of the at least one handshake response signal via at least one enable signal from the processor.

9. The method according to claim 5, comprising:
transmitting, by the drain bucket, an asserted handshake response signal in response to receiving an asserted handshake signal from the transmitting device.

10. The method according to claim 5, comprising:
looping back, by the drain bucket, the received at least one transmitter handshake signal as the at least one handshake response signal,
wherein the drain bucket is not capable of storing the received at least one transmitter handshake signal.

11. A system for handling data, comprising:
a transmitting device operatively coupled to an input port of a switch;
a receiving device operatively coupled to a first output port of the switch, the receiving device and the transmitting device being in communication via the switch;
a drain bucket operatively coupled to a second output port of the switch; and
a processor being operatively coupled to the transmitting device, the receiving device and the switch, the processor controlling the transmitting device, the receiving device and the switch,
wherein untransmitted data destined for the receiving device resides in an output buffer of the transmitting device when communication between the transmitting device and the receiving device is disrupted,
wherein the switch operatively couples the transmitting device to the drain device by operatively coupling the input port of the switch to the second output port of the switch, and
wherein the transmitting device transmits the untransmitted data through the switch to the drain bucket.

12. The system according to claim 11, wherein the transmitting device is not in communication with the drain bucket until after communication between the transmitting device and the receiving device is disrupted.

13. The system according to claim 11, wherein the processor configures the coupling between the input port of the switch and the second output port of the switch.

14. The system according to claim 13, wherein the switch comprises a crossbar switch that is configured by a decoder.

15. The system according to claim 11, wherein the drain bucket comprises circuitry that receives at least one transmitter handshake signal from the transmitting device.

16. The system according to claim 15, wherein the circuitry responds to the received transmitted handshake signal by transmitting a handshake response signal to the transmitting device.

17. The system according to claim 16, wherein the handshake response signal transmitted by the circuitry is asserted if the hand shake signal received by the circuitry is asserted.

18. The system according to claim 16,
wherein the circuitry enables looping back of the received at least one transmitter handshake signal as the at least one receiver handshake response signal, and
wherein the drain bucket is not capable of storing the received at least one transmitter handshake signal.

19. The system according to claim 16, wherein the circuitry enables generation of said at least one receiver handshake signal utilizing at least one of combinational logic and sequential logic.

20. The system according to claim 19,
wherein the circuitry enables generation of the at least one receiver handshake response signal via at least one enable signal, and
wherein the enable signal is generated by the processor through a decoder.

* * * * *